United States Patent
Stickney et al.

(10) Patent No.: US 7,033,569 B2
(45) Date of Patent: Apr. 25, 2006

(54) PROCESS FOR THE CONVERSION OF FEEDSTOCKS AND APPARATUS FOR PERFORMING THE SAME

(75) Inventors: Michael J. Stickney, Houston, TX (US); Edward M. Jones, Jr., Friendswood, TX (US); Mallasetty Sundacopa Chandrasekharaiah, deceased, late of Nassau Bay, TX (US); by Sudhir Kumar, legal representative, Memphis, TN (US)

(73) Assignee: MC International Research, Alvin, TX (US)

( * ) Notice: Subject to any disclaimer, the term of this patent is extended or adjusted under 35 U.S.C. 154(b) by 347 days.

(21) Appl. No.: 10/373,333

(22) Filed: Feb. 24, 2003

(65) Prior Publication Data

US 2004/0166055 A1 Aug. 26, 2004

(51) Int. Cl.
*C01B 3/24* (2006.01)
(52) U.S. Cl. .................................................... 423/650
(58) Field of Classification Search .............. 48/85, 48/127.9, 198.1; 252/373; 422/188, 189; 423/650; 431/2, 132, 259
See application file for complete search history.

(56) References Cited

U.S. PATENT DOCUMENTS

| | | |
|---|---|---|
| 2,958,716 A | 11/1960 | Lahr et al. |
| 3,192,280 A | 6/1965 | Landgren |
| 5,383,944 A * | 1/1995 | Matsui ..................... 48/197 R |
| 6,402,989 B1 | 6/2002 | Gaffney |

* cited by examiner

*Primary Examiner*—Colleen P. Cooke
(74) *Attorney, Agent, or Firm*—Streets & Steele; Frank J. Campigotto; Jeffrey L. Streets

(57) ABSTRACT

A process is provided for conversion of a feedstock, in particular a hydrocarbon feedstock such as methane or natural gas, in which a reactive mixture containing the feedstock is prepared and fed to a reaction zone. A reaction is initiated in the reactive mixture within the reaction zone so as to generate a conversion wave of increased temperature and pressure. The conversion wave is allowed to pass through the reaction zone, from where converted feedstock is recovered. An apparatus for carrying out the process is also provided. The process operates with a high conversion and selectivity to desirable products and is particularly suitable for the conversion of methane to carbon monoxide and hydrogen.

60 Claims, 7 Drawing Sheets

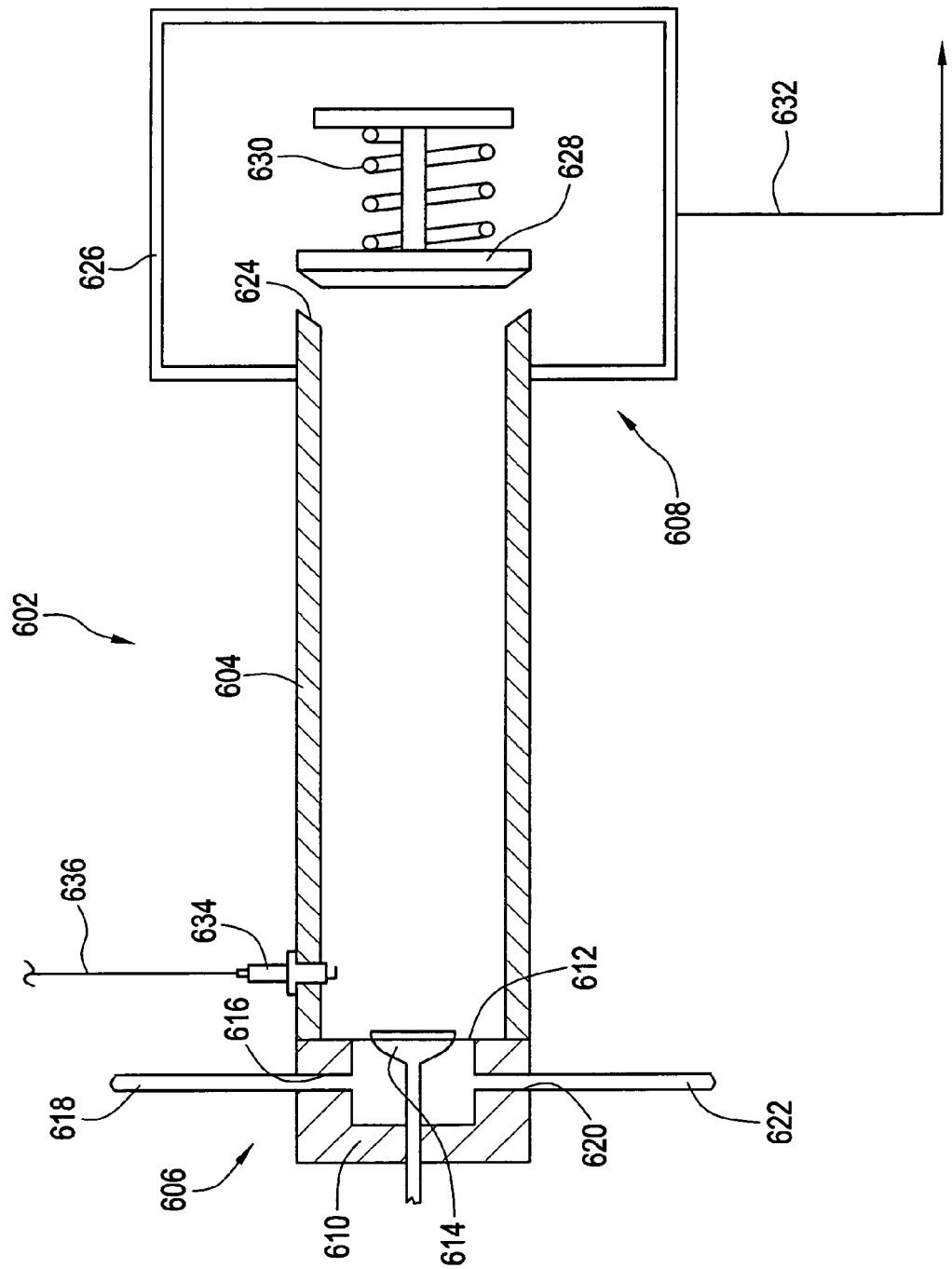

PROCESS FOR THE CONVERSION OF FEEDSTOCKS AND APPARATUS FOR PERFORMING THE SAME

BACKGROUND OF THE INVENTION

1. Field of the Invention

The present invention relates to a process for the conversion of compounds, in particular but not limited to hydrocarbons, and to apparatus for carrying out the process.

Many chemical processes are used to convert a compound or several compounds into other chemicals or products. The reactant compounds may react immediately on mixing or they may require an energy input to initiate the reaction. The energy required to initiate a reaction is the energy of activation. The energy of activation is typically supplied by a furnace.

Some processes require such a high temperature to supply the energy of activation that the feeds are prone to breaking down into unwanted side products, rather than react to form the desired products. In such cases a catalyst may be used to decrease the energy of activation. This translates into a lower temperature required to overcome the activation energy barrier between the feed and product. Unfortunately, catalysts can often cause undesirable side reactions themselves. Catalysts are also subject to deactivation by reactor feeds, contaminants or products. In addition, the use of a catalyst can significantly increase the complexity of the process being conducted, for example in handling the catalyst and ensuring adequate contact between the components to be reacted and the catalytically active components.

Clearly, uncatalyzed reactions would be preferable if some other form of energy input to overcome the activation energy barrier were available.

One example of such a reaction is the partial oxidation of hydrocarbons to form a mixture of carbon monoxide and hydrogen. The partial oxidation of methane takes place by the following reaction:

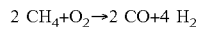

$$2\ CH_4 + O_2 \rightarrow 2\ CO + 4\ H_2$$

The product mixture of this reaction is referred to as synthesis gas or syngas. In the existing art, a substoichiometric mixture of hydrocarbon and oxygen are fed to a burner and combusted at temperatures of 1000° C. to 1500° C. Thermodynamics dictate that carbon dioxide and water will also be produced in the above reaction. Carbon monoxide is thermodynamically favored at higher temperatures. In addition, above 950° C., the following reaction becomes thermodynamically important:

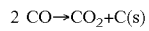

$$2\ CO \rightarrow CO_2 + C(s)$$

The degradation of carbon monoxide to carbon dioxide and solid carbon is kinetically slower than the formation of carbon monoxide. Numerous schemes have been devised to thermally quench the synthesis gas product before the degradation reaction can occur.

The partial oxidation reaction can be catalyzed between 800° C. and 1000° C. by noble metal catalysts. Even at this temperature the formation of solid carbon is significant and eventually causes deactivation of the catalyst.

2. Description of Related Art

The problems encountered in the catalytic partial oxidation of hydrocarbons are summarized in U.S. Pat. No. 6,402,989, where it is described that none of the existing processes or catalysts provide a partial oxidation catalyst or process capable of high conversion and high selectivity capable of operation with very low coke formation. Accordingly, as indicated in U.S. Pat. No. 6,402,989, there exists a need for a process and catalyst for the catalytic partial oxidation of hydrocarbons, particularly methane, that has low coke formation, high conversions of methane and high selectivities to CO and H.sub.2, and that is economically feasible at commercial-scale conditions.

The synthesis gas reaction is commercially important for the production of numerous chemicals. More recently it has received increased interest as a means of providing feed for Fischer-Tropsch processes used to convert remote natural gas to low sulfur liquid fuels. These are referred to as gas-to-liquids (GTL) processes. The synthesis gas process is the largest capital and operating expense in a GTL plant.

There is a need for a simple process scheme in which the conversion of compounds, such as hydrocarbons, can be achieved at high efficiencies with a minimum of design and operation complexities.

U.S. Pat. No. 2,958,716 describes a process in which a shock wave is employed to prepare acetylene from hydrocarbons. The process employs a shock wave generated in one of two alternative ways. In a first embodiment, a charge of a combustible mixture is ignited to cause a detonation. The detonation is allowed to pass through a so-called cracking charge consisting of a hydrocarbon to be cracked. The cracking charge comprises a hydrocarbon, such as methane or other lower alkane. Oxygen may be present in the cracking charge, optionally in an amount sufficient to render the cracking charge detonable. U.S. Pat. No. 2,958,716 states that this can lead to increased propagation of the shock wave through the cracking charge. The detonation, if employed, is generated by igniting a combustible mixture of hydrogen and oxygen. The apparatus of U.S. Pat. No. 2,958,716 employs a membrane, such as paper, to separate the detonation charge and the cracking charge from one another prior to the detonation taking place. Some separation of the two charges is also suggested in U.S. Pat. No. 2,958,716 using a layer of inert gas, such as argon. However, the control of the gaseous charges in such an arrangement is particularly difficult. There are no examples of the use of an inert gas separation layer in the specification of U.S. Pat. No. 2,958,716. A further arrangement employs a detonation zone and a cracking zone without any means of separating the detonation and cracking charges.

In a second embodiment of U.S. Pat. No. 2,958,716, a shock wave is generated by the use of a shock tube, in which gas pressure is applied to one side of a rupture disc or membrane. The applied pressure differential across the membrane is sufficient to rupture the membrane, thereby generating a shock wave. The shock wave thus generated is caused to pass through the charge to be cracked. In the examples of this second embodiment, the cracking charge is made up of a lower hydrocarbon, typically methane, admixed with an inert gas, in particular argon and helium, and in some examples oxygen. Hydrogen is used in each example as the pressurised driver gas to create the shock wave. The reliance on the use of a plurality of different gas mixtures and the seeming need to employ inert gases renders the process of U.S. Pat. No. 2,958,716 unattractive for use on a commercial scale.

The specific examples of U.S. Pat. No. 2,958,716 show a range of efficiencies in converting hydrocarbons in the cracking charge using the two embodiments. When the first embodiment is employed, the conversions of the hydrocarbon range from just a few percent to about 19 percent. The second embodiment, using hydrogen as the shock medium, achieved a hydrocarbon conversion to acetylene of almost 25 percent. Using helium as the shock medium and a mixture of methane and chlorine achieved an overall conversion of methane of about 80 percent. The results in U.S. Pat. No. 2,958,716 clearly suggest that the best conversion is achieved using a shock tube arrangement in which a pressurized inert driver gas is used to generate a shock wave to impact the cracking charge.

U.S. Pat. No. 3,192,280 discloses a process in which methane is converted into acetylene. In the process, a combustible mixture of methane and oxygen is fed to the combustion head of a truncated cone reactor. Methane is fed to the reactant head of the reactor. The combustible mixture is ignited, generating a shock wave that resonates within the reactor and converts the methane at the reactant head. A yield of 65% by weight acetylene on the basis of the methane feed is indicated. U.S. Pat. No. 3,192,280 suggests that other hydrocarbons, from $C_1$ to $C_{12}$ may be used as the feedstock to the reactant head of the reactor. The reactor configuration of U.S. Pat. No. 3,192,280 is complex, requiring a sophisticated arrangement of feed lines and nozzles in both the combustion head and the reactant head of the reactor.

There is a need for a simple process capable of converting a reactive feedstock, that is simple to operate, requires only very simple apparatus and is easily adapted to a variety of scales of throughput and operation.

SUMMARY OF THE INVENTION

According to the present invention there is provided a process in which a conversion wave is initiated from a reactive mixture and allowed to pass through a volume of the reactive mixture within a reaction zone. In this respect, the term "conversion wave" as used herein is a reference to a transient condition of elevated temperature and pressure generated by and sustained by the reaction of the components of a reactive mixture.

According to a first aspect, the present invention provides a process for the conversion of a feedstock, comprising:
preparing a reactive mixture comprising the feedstock;
feeding the reactive mixture to a reaction zone;
initiating a reaction in the reactive mixture, thereby generating a transient conversion wave of increased temperature and increased pressure;
allowing the transient conversion wave to pass through the reactive mixture present in the reaction zone; and
recovering at least partially converted feedstock from the reaction zone.

The feedstock is most preferably a reactive component of the reactive mixture.

The conversion wave is preferably generated periodically. In this case, it is preferred that the reaction zone is filled with the reactive mixture and that each generation of the conversion wave is caused to pass through the entire reaction zone. In this way, the process can be caused to operate on a most efficient conversion per pass. In such a process operating scheme, the generation of the conversion wave is timed to occur when the reaction zone is substantially filled with fresh reactive mixture.

In an especially preferred arrangement, the generation of the conversion wave is triggered by the reaction zone becoming filled with fresh reactive mixture, thus ensuring that each conversion wave acts on a maximum charge of fresh reactants. In the case that the reactive mixture is combustible, the triggering of the initiation of the conversion wave is conveniently achieved by providing a constant or periodic ignition source, such that filling the reaction zone brings a fresh charge of reactants into contact with the ignition source. In a similar way, other reactive mixtures may be triggered by a means or agent for initiating the reaction and generating the conversion wave, for example a localized source of high temperature heat to provide a thermal initiation of the reaction, or a catalyst to induce the reaction to start.

The feedstock of the process may be any feedstock capable of forming a reactive mixture and sustaining a conversion wave. The reactive mixture in the process is in the gaseous or vapour phase. Feedstock components that are liquid or solid at ambient conditions may be converted in the process, provided they are first converted into a gaseous or vapour phase. Alternatively, normally liquid feedstocks may be prepared in the form of an aerosol, that is a fine suspension of liquid droplets in a gaseous medium, which aerosol may be used directly in the process of the present invention. Normally solid feedstocks may be prepared as a finely divided solid or dust, which is suspended in a gaseous medium and used directly in the process.

The process has been found particularly suitable for the conversion of hydrocarbons. The process is particularly suitable for the conversion of normally gaseous hydrocarbons. Normally liquid hydrocarbons may be converted in the process of this invention, but require conversion into a vapour or aerosol, as noted above. The hydrocarbons to be converted may be straight chain or branched chain, aliphatic or aromatic, or mixtures of these components. Lower hydrocarbons are preferred feedstocks, that is hydrocarbons having from 1 to 4 carbon atoms. The process is particularly suited to the conversion of alkanes, alkenes and alkynes, preferably lower alkanes, lower alkenes and lower alkynes. Lower alkanes are especially preferred feedstock components and include methane, ethane, propane and butane. Methane is a particularly preferred alkane feedstock. The methane to be converted may be present in the form of natural gas, associated gas or refinery gas, all of which are very suitable for conversion in the process of the present invention.

The process of the present invention may also be advantageously applied in the conversion of gas produced by the microbial fermentation and digestion of biomass, such as plant material, animal waste and sewerage, and gaseous mixtures recovered from garbage disposal sites. Typically, suitable gases are produced by the anaerobic decomposition of such materials using microorganisms.

The feedstock to be converted may comprise oxygen or an oxygen-containing compound. Oxygen may be employed as the substantially pure compound, or may be accompanied by inert compounds, such as nitrogen. Air is a convenient source of oxygen for use in the process.

If oxygen is present in the feedstock to be converted, the reactive mixture formed in the reaction zone is most preferably combustible. It is possible to operate the process of the present invention with a mixture that is outside the flammability range. However, it has been found that very high conversions of the feedstock with attendant high yields of desirable products are obtained when the reactive mixture lies within the flammability range. It has been found that the efficiency of the process, in terms of both overall conversion and yield, is particularly high when working within a range of 10%, more preferably 5%, above or below the upper limit of concentration of the non-oxygen component in the reactive mixture.

In the case that methane and oxygen make up the major component of the reactive mixture, the limits of flammability for the two-component mixture are from about 5% vol to about 60% vol methane. Thus, in the case of a reactive mixture comprising methane and oxygen, it is preferred to operate the process with a reactive mixture comprising from 50% vol to 70% vol, more preferably from 55% vol to 65% vol methane. If an inert gas is present in the reactive mixture, it is preferred to employ higher concentrations of oxygen, to again be within the preferred range either side of the flammability limit.

Flammability limits for the reactive mixture of the process are either known in the art, for mixtures such as methane/oxygen and methane/oxygen/nitrogen, or can be readily determined using routine experimental techniques.

The reaction in the reactive mixture may be initiated using any suitable method or means for the particular reactive mixture being processed. Suitable methods for initiating the reaction include both chemical initiation and physical initiation.

Chemical initiation includes introducing small quantities of one or more compounds or components that initiate a reaction within the reactive mixture in a localized region, the reaction once started propagating through the reaction zone as the conversion wave. Examples of such initiation compounds are catalysts, such as solid or particulate catalysts, which are active in starting the reaction in the reactive mixture. The chemical initiator, such as catalysts, may be introduced into the reactive mixture at the position and time required to generate the conversion wave. Alternatively, the initiator may be retained or fixed in an arrangement whereby it contacts the reactive mixture at the appropriate time in the process, for example by having the reactive mixture flow into contact with the initiator.

Physical initiators can also be employed to initiate the reaction in the reactive mixture. Physical initiation includes exposing the reactive mixture to high temperatures or irradiation, for example by electromagnetic radiation, such as light or infrared radiation.

The initiator of the reaction may be operated continuously, such as the case with chemical initiation using a retained solid catalyst or in the case of physical initiation using a constant source of high temperature or electromagnetic radiation. Alternatively, the initiation may be periodic, such as the periodic introduction of an initiator compound into the reactive mixture or irradiating the mixture with discrete bursts of radiation.

If the process of the present invention is operated using a reactive mixture that is flammable, it is most convenient to initiate the reaction to generate the conversion wave by igniting the reactive mixture. The source of ignition to generate the conversion wave may be operated periodically or continuously, as noted above. Periodic sources of ignition include an electrical discharge, for example using a conventional spark plug. Continuous sources of ignition for the reactive mixture may be obtained, for example, using a heated element. If a continuous source of ignition is employed, the conversion wave is generated when the mixture in the region of the ignition source is a combustible mixture, this mixture being ignited by the ignition source.

The conversion wave may be generated so as to pass through the reaction zone co-currently with the flow of the reactive mixture through the reaction zone. In such a case, the reaction is initiated at or adjacent the inlet of the reaction zone. Alternatively, the conversion wave may be caused to pass counter-currently through the reaction zone. In such a case, the reaction is initiated at or adjacent the outlet of the reaction zone.

A further alternative is to arrange for the reaction to be initiated within the reaction zone, such that conversion waves travels outwards from a central region of the reaction zone to both the inlet and the outlet. In this respect, it has been found that it is possible for a combustible feed gas mixture entering the reaction zone to ignite and form a continuously burning flame, when the reaction is initiated at or adjacent the inlet of the reaction zone. In one advantageous embodiment, the initiator of the reaction is located in the region of the inlet to the reaction zone, but spaced within the reaction zone a distance from the inlet. The distance is such that the conversion wave generated and traveling in the direction of the inlet to the reaction zone is sufficiently well formed to reach its terminal velocity within the reaction zone. In this way, the temperature in the region of the inlet of the reaction zone is kept too low to generate and maintain a constant flame. However, the reaction initiator is close enough to the inlet of the reaction zone, so as not to have sufficient momentum to damage the apparatus at the region of the inlet.

In a preferred arrangement, the timing of the initiation of the reaction in the reactive mixture to generate the conversion wave is determined by the time required to fill the reaction zone with fresh reactive mixture of feedstock. Preferably, the reaction is initiated when the reaction zone is at least 70 to 80% filled with the reactive mixture, more preferably from 70 to 90% filled with reactive mixture. More preferably, the reaction is initiated when the reaction zone is substantially filled with reactive mixture. In one preferred arrangement, the reaction zone is an elongate reaction zone, for example housed within a tubular reactor. The passing of the conversion through the reaction zone will convert the reactive mixture present in the reaction zone. The products of this conversion are removed and the reaction zone charged with a fresh volume of reactive mixture. The substantially complete filling of the reaction zone with the reactive mixture is one convenient and efficient trigger for the initiation of the reaction, as it ensures that each conversion wave has the maximum volume of reactive mixture to convert. The reaction may be triggered by any suitable control system, to coordinate the filling of the reaction zone and the triggering of the reaction initiation. One preferred arrangement comprises placing the means for initiating the reaction, such as the ignition source, at a position within the reaction zone such that fresh reactive mixture entering the reaction zone only reaches this position when the reaction zone is filled with a fresh charge.

The reaction zone has an inlet at one end for the reactive mixture comprising the feedstock and an outlet for the products of the conversion at the other end. In one embodiment, the means for initiating the reaction, such as an ignition source, are placed adjacent the outlet of the reaction zone, either within the reaction zone or outside the reaction zone. In this arrangement, the reaction is triggered when the fresh reactive mixture comes into contact with the ignition source. If the triggering of the initiation of the reaction in the reactive mixture is achieved in such a manner, the means initiating the reaction is conveniently operated continuously, such as a heated element, as noted before. If the initiating means is operated periodically, such as a periodic electrical discharge, the frequency of the operation is sufficiently high such that the time interval between successive operations is no greater than the time taken to fill the reaction zone with a fresh charge of reactive mixture. Preferably, the frequency of operation is significantly higher, such that the time taken to fill the reaction zone with fresh reactive mixture is at least twice the time between successive operations, more preferably at least 5 times, still more preferably at least 10 times.

A most convenient arrangement is to operate the initiation means as an electrical discharge at the frequency of the alternating current electrical supply.

In an alternative preferred embodiment, the means for initiating the reaction, such as an ignition source, are located near the reactor inlet. In such an arrangement, the initiating means are operated at a predetermined frequency that corresponds to the substantial filling of the reactor zone. As noted above, it is preferred that the reaction is initiated when the reaction zone is at least 70 to 80% filled with fresh reactive mixture, more preferably from 70 to 90% filled. It is preferred that the reaction is substantially filled with reactive mixture. In this arrangement, the flow of fresh reactive mixture to the reaction zone may be interrupted. This may be required, in order to avoid the formation of a continuous flame at the reactor zone inlet. Alternative means for preventing the formation and maintenance of such a flame may be provided at the inlet of the reaction zone.

As noted, it is an advantage of the process of the present invention that the reaction zone may be adapted to a wide variety of scales and feedstock throughput. This may be achieved by varying the overall dimensions of the reaction zone according to the duty to be performed, or by using a plurality of reaction zone modules connected to single feed and product processing units. The ability of the timing of the initiation of the reaction within the reaction zone to be varied within the ranges mentioned above is an advantage when a plurality of similar reaction zone modules are operated within a single unit. It is possible to operate the reactions zones such that the initiation of the reaction within the reaction zones is staggered and not occurring in all units at the same time. This will place less shock stress on the apparatus within which the process is being operated.

The reactive mixture may be fed to the reaction zone batch wise, after each pass of a conversion wave through the reaction zone. It is a most advantageous feature of the process of this invention that it can operate with a continuous supply of fresh reactive mixture to the reaction zone. In this respect, references to continuous supply include very short interruptions in the supply of fresh reactive mixture due to the increased pressure of the conversion wave passing in the reverse direction to the direction of flow of fresh reactant through the reactor.

The increases in pressure and temperature resulting from the initiation and propagation of the conversion wave in the reaction zone are preferably damped at the outlet of the reaction zone, in order to prevent pressure surges in the downstream processing equipment. This may be achieved by having the components leaving the reaction zone pass through an energy absorber, sufficient to remove a substantial portion of the energy contained within the conversion wave. A convenient way of damping the pressure waves is to have the outlet of the reaction zone opening into a liquid bath, such as water. This is conveniently arranged by means of a dip tube. Alternatively, the components leaving the outlet of the reaction zone may be contacted with a spray of liquid, again such as water, in a suitable vessel.

Passing the products of the conversion through a liquid, such as water, or contacting the products with a liquid spray also provides a first stage in the separation and refining of the products. In particular, in cases where the feedstock comprises a hydrocarbon, carbon or soot may be formed in small quantities during the conversion. The water bath or spray retains the carbon in the liquid phase, from where it may be separated and subsequently processed.

In one embodiment of the present invention, the outlet of the reaction zone is provided with an outlet valve. When the outlet valve is opened, it is possible to remove converted feedstock from the reaction zone. It is preferred that the outlet valve is activated by the conversion wave, such as a pressure relief valve. The use of such a valve allows a high pressure product to be recovered. This reduces the need for compressing the products before further processing. In addition, it has been found that the use of such a valve reduces the effects of the conversion wave, in particular the high pressure pulses resulting from the wave, simplifying the apparatus needed to put the process into effect and reducing the wear on the apparatus.

Accordingly, in this embodiment, the present invention provides a process for the conversion of a feedstock, the process comprising:

forming a combustible mixture comprising the feedstock;

feeding the combustible mixture to an inlet of a reaction zone, the reaction zone having an outlet spaced from the inlet;

stopping the feed of the combustible mixture;

providing a source of ignition in the reaction zone;

allowing the source of ignition to ignite the combustible mixture, thereby generating a combustion wave;

allowing the combustion wave to travel through the reaction zone;

allowing the combustion wave to open a valve in the outlet of the reaction zone, thereby removing converted feedstock from the outlet of the reaction zone.

In a further embodiment, the present invention provides a process for the conversion of a feedstock, the process comprising:

forming a combustible mixture comprising the feedstock;

continuously feeding the combustible mixture to an inlet of a reaction zone, the reaction zone having an outlet spaced from the inlet;

providing a source of ignition in the reaction zone;

allowing the source of ignition to ignite the combustible mixture, thereby generating a combustion wave;

allowing the combustion wave to travel through the reaction zone; and continuously removing converted feedstock from the outlet of the reaction zone.

In a further embodiment, the invention provides a process for the conversion of a feedstock comprising methane and oxygen, the process comprising:

forming a combustible mixture comprising methane and oxygen;

continuously feeding the combustible mixture to an inlet of a reaction zone, the reaction zone having an outlet spaced from the inlet;

providing a source of ignition in the reaction zone;

allowing the source of ignition to ignite the combustible mixture, thereby generating a combustion wave;

allowing the combustion wave to travel through the reaction zone;

continuously removing converted feedstock from the outlet of the reaction zone; and passing the converted feedstock through an energy absorber to produce a treated product stream.

The process of the present invention has been found to be very efficient in the conversion of hydrocarbons, in particular methane, to carbon monoxide and hydrogen, with a very high selectivity to these two desirable products, with minimum formation of carbon dioxide, water or soot.

As noted, the process of the present invention is particularly suited to the conversion of hydrocarbon feedstocks, in particular to form carbon monoxide and hydrogen. The process of the present invention may be applied to the conversion of any components that can be formed into a mixture capable of reacting exothermically and sustaining a conversion wave. Further examples of conversions that may be performed using the process of the present invention include the oxidation of sulphur and hydrogen sulphide, the oxidation of nitrogen and ammonia, the formation of ammonia from mixtures of hydrogen and nitrogen, and the reaction of ammonia with carbon dioxide to form ammonium carbamate and urea.

In a further aspect, the present invention provides an apparatus for use in carrying out the process described above. According to the present invention there is provided an apparatus for the conversion of a reactive feedstock, the apparatus comprising:

a reaction zone having an inlet and an outlet; and an initiator of a reaction in the reactive mixture adjacent in the reaction zone.

The apparatus preferably comprises a mixing zone connected to or adjacent the inlet of the reaction zone, in which a reactive mixture is formed. This is particularly the case where the feedstock is not itself reactive and is to be mixed with one or more additional components, for example an oxygen-containing gas. The mixing zone has one or more inlets for the feedstock and other components to be converted and an outlet connected to the inlet of the reaction zone. The mixing zone may comprise one or more means for mixing the reactants, for example static mixers past which the reactants are caused to flow causing them to mix.

The initiator may be situated at or adjacent the outlet of the reaction zone. In such an arrangement, the conversion wave generated by the initiation of the reaction at or close to the outlet of the reaction zone will pass through the reaction zone from the outlet to the inlet, that is countercurrent to the flow of reactive mixture within the reactor. Alternatively, the initiator may be located at or adjacent the inlet of the reaction zone, whereby the conversion wave is caused to pass through the reaction zone from the inlet to the outlet, that is co-current with the flow of reactive mixture. In a further alternative arrangement, the initiator may be placed between the inlet and the outlet of the reaction zone, whereby the conversion wave will dissipate outwards from a central region of the reactor to both the inlet and the outlet. A combination of these arrangements may also be employed.

The initiator is preferably an initiator module having an inlet and an outlet, the inlet of the initiator module being in flow communication with the inlet or the outlet of the reaction zone. The initiator module comprises the means for initiating the reaction in the reactive mixture, generating the conversion wave, which is then caused to pass through the reaction zone. The initiator module may comprise any suitable means for initiating the reaction. The initiation of the reaction may be chemical or physical, as noted above. Chemical initiators may be retained in the initiator module, or introduced into the reactive mixture when the reaction is to be initiated.

In a preferred embodiment, the reactive mixture is a combustible mixture. In this case, it is preferred to initiate the reaction by igniting the mixture. The reaction initiator may be a heated element. However, it is preferred to provide the initiator module with the means to generate a spark by means of an electrical discharge. A conventional spark plug with its electrodes extending into the initiator module is a most convenient arrangement. The electrical discharge generating the spark may be provided in a conventional well known to the person skilled in the art. Preferably the spark is generated at a frequency such that the time between successive sparks is no greater than the time taken for the reaction zone, the mixing zone and initiator module if present, to fill with reactive mixture. More preferably, the time between successive initiations of the reaction is significantly less than this time.

In the case of embodiments in which the initiator is at or in the region of the outlet of the reaction zone, it may be necessary to ensure the conversion wave, once generated, passes through the reaction zone. The apparatus preferably comprises a restriction to the flow of gases downstream of the outlet of the reaction zone. The restriction may be at or adjacent the outlet or downstream of the outlet. If the apparatus comprises an initiator module, the restriction is placed downstream of the outlet of this module. Conveniently, the restriction is built into the outlet of the initiator module. The restriction may be any suitable means, for example an orifice plate or perforated plate. The restriction in flow of gases downstream is such that the conversion wave, once generated, is caused to pass into and through the reaction zone, rather than in the downstream direction.

The generation of the conversion wave causes a pulse in the pressure within the apparatus. To even these pressure pulses and reduce or eliminate their effect on the downstream equipment and processing, the apparatus preferably comprises an energy absorbing or damping system downstream of the reaction zone. This is conveniently provided by a vessel retaining a volume of liquid, preferably water, and having the components leaving the reaction zone pass into the level through a dip pipe extending below the surface of the liquid. The vessel is provided with an outlet, connected to a disengagement pipe, in which the gas stream and any entrained liquid are separated. Entrained liquid recovered in this way may be recycled to the vessel.

Alternatively, the components leaving the reaction zone may be passed into a vessel having an inlet for a spray of liquid droplets, such as water. The vessel is arranged such that the components leaving the reactor are contacted by the liquid spray. A disengager is employed to separate the gaseous components from any entrained liquid. Entrained liquid may be recycled to the spray inlet of the vessel.

The apparatus in one embodiment comprises an inlet valve and an outlet valve for controlling the flow of components into and out of the reaction zone. Preferably, the outlet valve is openable by the conversion wave generated in the reaction zone, in particular the high pressure pulse generated by the wave. In this way, the high pressure generated by the conversion wave is retained and utilized to produce a high pressure product. This product may be collected in a high pressure product receiver. Accordingly, the present invention in one aspect provides an apparatus for the conversion of a reactive feedstock, the apparatus comprising:

a reactor comprising a first inlet for the feedstock and a second inlet for an oxygen-containing gas;

a mixing zone for mixing the feedstock and the oxygen-containing gas to form a combustible mixture thereof;

a reaction zone having an inlet and an outlet, the inlet of the reactor zone being in communication with the outlet of the mixing zone;

an inlet valve at the inlet of the reactor zone for controlling the flow of the combustible mixture into the reactor zone;

an initiator comprising an ignition source capable of igniting the combustible mixture within the reactor zone;

an outlet valve at the outlet of the reactor zone openable at a predetermined elevated pressure within the reactor zone;

a high pressure product receiver in communication with the outlet valve.

In a further embodiment, the present invention provides an apparatus for the conversion of a reactive feedstock, the apparatus comprising:

a reactor comprising a first inlet for the feedstock and a second inlet for an oxygen-containing gas;
a mixing zone for mixing the feedstock and the oxygen containing gas to form a combustible mixture thereof;
a reaction zone having an inlet and an outlet, the inlet of the reactor zone being in communication with the outlet of the mixing zone;
an initiator zone comprising an ignition source capable of igniting the combustible mixture and operable at a frequency such that the time between successive operations of the ignition source is less than the time taken for the combustible mixture to travel from the inlet of the reaction zone to the outlet of the reaction zone; and
a constriction downstream of the initiator and reaction zones.

The process and apparatus described above represent a very simple and efficient process scheme that may be operated to convert a feedstock, such as hydrocarbons. It is a significant advantage of the process and apparatus that they can be operated on a continuous basis, with a continuous feed of reactants to the reaction zone and a continuous withdrawal of product. The apparatus also lends itself very well to being scaled up or down, according to the throughput required. The apparatus is particularly suitable for scaling up on a modular basis.

In an alternative embodiment, the present invention provides a process for the conversion of a combustible feedstock, comprising:

providing a first combustible mixture comprising the feedstock to a reaction zone;

providing a second combustible mixture comprising the feedstock to a driver zone;

igniting the first combustible mixture in the driver zone, thereby generating a conversion wave of elevated temperature and pressure;

allowing the conversion wave to enter and pass through the reaction zone; and recovering at least partially converted feedstock from the reaction zone.

It is an advantage of this process that the same feedstock is employed in both the driver zone and the reaction zone, simplifying the process scheme considerably. For the simplest process scheme, the first and second combustible mixtures preferably have substantially the same composition.

Preferably, the reaction zone and the driver zone are separated and isolated from one another until the respective zones have been filled. Separation of the driver zone and the reaction zone allows the composition of the mixture for generation of the conversion wave to be more easily optimized. Similarly, the composition of the mixture in the reaction zone can be optimized for increased conversion and product selectivity. Separation may be obtained using a membrane or a valve. Preferably, a membrane is employed, the membrane constructed to rupture under the action of the conversion wave generated in the driver zone. Alternatively, the membrane is ruptured mechanically by a separate means at the appropriate time in the process sequence. If the separation of the driver and reaction zones is achieved using a valve, the valve is opened before the reaction is initiated in the driver zone.

The feedstock may be any combustible component. The feedstock is preferably normally gaseous. Normally liquid feedstocks may be gasified before being used as feedstocks in the process. Alternatively, the liquid feedstocks may be prepared in the form of an aerosol, as noted above. Solid feedstocks may also be employed, once the feedstock has been prepared as a suspension of a finely divided particles or dust, again as discussed above.

The preferred feedstock is one or more hydrocarbons, most preferably a normally gaseous hydrocarbon. The hydrocarbons to be converted may be straight chain or branched chain, aliphatic or aromatic, or mixtures of these components. Lower hydrocarbons are preferred feedstocks, that is hydrocarbons having from 1 to 4 carbon atoms. The process is particularly suited to the conversion of alkanes, alkenes and alkynes, preferably lower alkanes, lower alkenes and lower alkynes. Lower alkanes are especially preferred feedstock components and include methane, ethane, propane and butane. Methane is a particularly preferred alkane feedstock. The methane to be converted may be present in the form of natural gas, associated gas or refinery gas, all of which are very suitable for conversion in the process of the present invention. In addition, the feedstock may comprise gas produced by the microbial decomposition of organic matter, such as biomass, as discussed above.

Alternative reactions that may be conducted in the process include the oxidation of sulphur and nitrogen.

The first and second combustible mixtures comprise oxygen or an oxygen-containing compound. Oxygen may be employed as the substantially pure compound, or may be accompanied by inert compounds, such as nitrogen. Air is a convenient source of oxygen for use in the process.

It has been found that the efficiency of the process, in terms of both overall conversion and yield, is particularly high when the composition of the first combustible mixture is within a range of 10%, more preferably 5%, above or below the upper limit of concentration of the non-oxygen component in the reactive mixture.

In a still further aspect, the present invention provides a process for the conversion of a component comprising:

forming a reactive mixture comprising the component within a reaction zone having an outlet;

initiating a reaction within the reactive mixture to form a high pressure conversion wave;

allowing the conversion wave to travel through the reaction zone;

opening the outlet of the reaction zone under the action of the high pressure conversion wave; and collecting a high pressure product.

As noted above, known process schemes for the conversion of many components require the use of high temperatures. This is particularly so in the case of the conversion of hydrocarbons, such as methane, to carbon monoxide and hydrogen. Even processes relying upon catalysts to perform this conversion require the use of highly elevated temperatures. It is a major advantage of the process schemes of the present invention that such conversions can be conducted at significantly lower temperatures than the prior art processes, while achieving equally high or greater conversions and yields of the desired products. dr

BRIEF DESCRIPTION OF THE DRAWINGS

The present invention will now be described for illustrative purposes only by way of the following examples having reference to the accompanying figures, in which:

FIG. 7 is a cross-sectional representation of the apparatus of FIG. 6 in a second operating position.

DESCRIPTION OF THE PRESENTLY PREFERRED EMBODIMENTS

Figure 1:
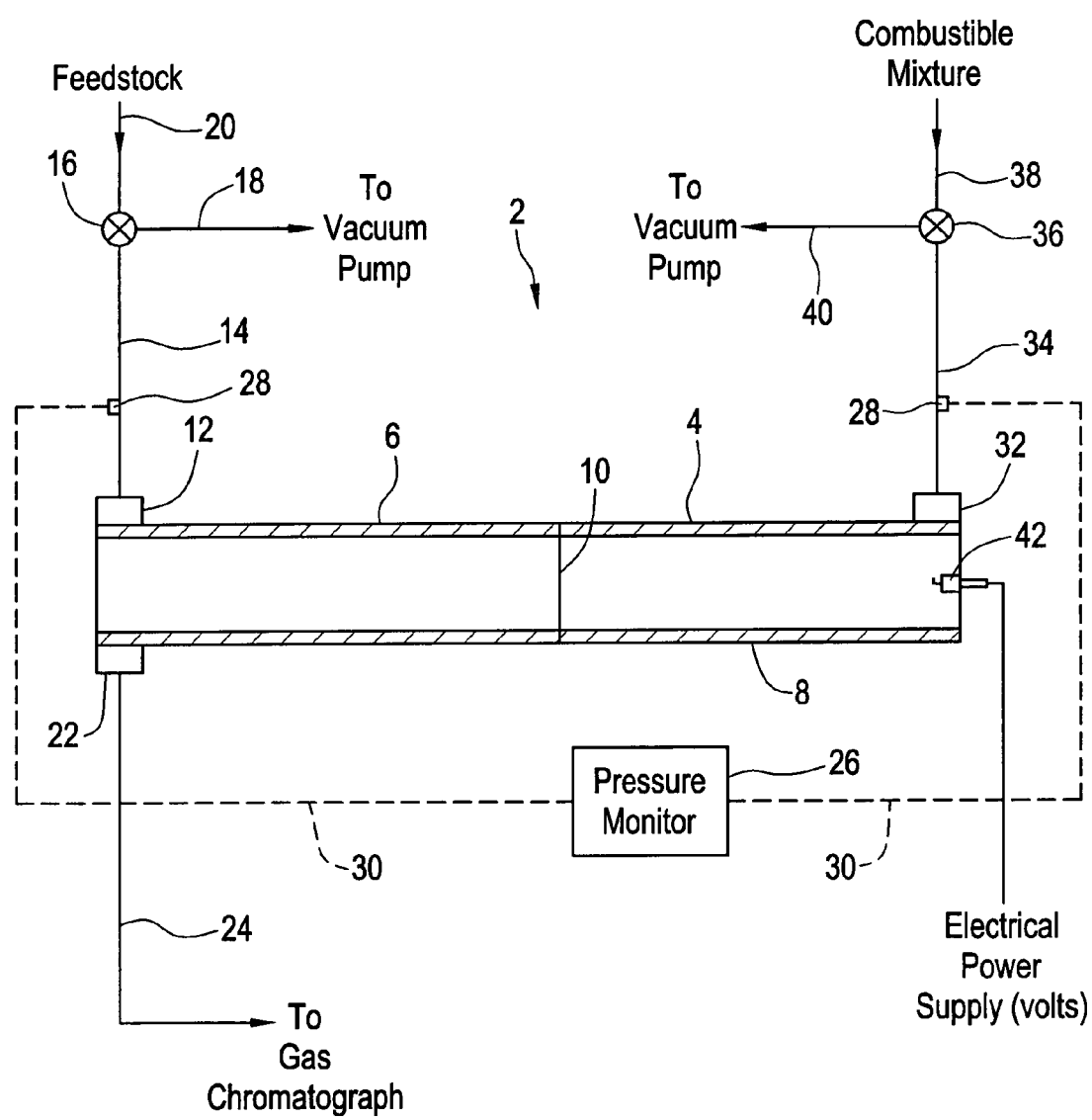
FIG. 1 is a cross-sectional representation of a first embodiment of the apparatus according to the present invention.

Referring to FIG. 1, an apparatus according to a first embodiment of the present invention is shown. The apparatus, generally indicated as 2, comprises a tubular reactor 4 having a reaction portion 6 and a driver portion 8 separated from the reaction portion 6 by a membrane in the form of a rupture disk 10. The reactor 4 may be formed from any suitable material capable of withstanding the conditions prevailing within the reactor during operation of the process. Steel, in particular stainless steel, is a most suitable material. The reactor may be any suitable diameter and of any suitable length, provided that the conversion wave is properly generated and propagated.

The rupture disc 10 is retained within the reactor 4 by any suitable means, for example using two opposing flanges (not shown), one on each opposing end of the reaction portion 6 and the driver portion 8. Any suitable membrane or other separating device may be employed in place of the rupture disc, provided that the conversion wave generated within the driver portion 8 is allowed to pass into the reaction portion 6 without being substantially diminished. The membrane is most preferably ruptured upon being impacted by the conversion wave generated in the driver portion 8. However, it is also possible to arrange for the membrane to be ruptured by some mechanical or other means timed to coincide with the ignition of the feedstock charge in the driver portion 8.

The reaction portion 6 is provided with a port 12, through which components may be supplied to and withdrawn from the reaction portion. A line 14 extends from the port 12 in the reaction portion 6 to a 3-way valve 16 having two positions. In a first position, the valve 16 connects the line 14 to a further line 18 leading to a vacuum pump (not shown). In a second position, the valve 16 connects the line 14 to a feed line 20, which is in turn connected to a reservoir of feedstock (not shown). The feedstock may be retained in any suitable vessel, with commercially available pressurized gas bottles being convenient storage vessels. The storage vessel is preferably provided with a flow regulation device, such as a valve, to regulate the flowrate of feedstock to the reactor portion.

The reaction portion 6 is provided with a second outlet port 22, connected by means of a line 24 to a gas chromatograph (not shown). Converted feedstock may be withdrawn from the reaction zone within the reaction portion 6, for compositional analysis by the gas chromatograph. Suitable gas chromatographs for use in the apparatus are well known in the art and commercially available.

The respective pressures in the reaction zone 6 and driver zone 8 are monitored by means of pressure monitors 26 connected to a series of pressure transducers 28 in the feed lines 34 by lines 30.

The driver portion 8 of the reactor 4 comprises an inlet 32 connected by a line 34 to a three-way valve 36. The valve 36 has a second port connected to a line 38 through which a combustible mixture may be fed to the driver portion 8 of the reactor 4. A third port of the valve 36 is connected by a line 40 to a vacuum pump (not shown).

The driver portion 8 of the reactor 4 is further provided with an ignition source in the form of a spark plug 42 connected to a high voltage supply comprising a Tesla coil (not shown).

The apparatus as shown in FIG. 1 is operated as follows:

A rupture disc 10 is secured within the reactor 4. The entire reactor 4, including both the reaction portion 6 and the driver portion 8, is evacuated by means of the vacuum pumps once the valves 16 and 36 have been positioned appropriately. The valve 36 is repositioned, to allow the driver portion 8 of the reactor 4 to be charged with a combustible mixture to the required pressure. The valve 16 is repositioned and feedstock mixture to be converted is fed via the lines 20 and 14 to the reaction zone 6 of the reactor 4 at the required pressure. A sufficient voltage is applied to the spark plug 42 to generate a spark across the terminals, thereby igniting the charge of combustible mixture in the driver zone 8 of the reactor 4. The ignition of the combustible mixture generates a wave of elevated temperature and pressure, which ruptures the rupture disc 10, allowing the wave to pass along the reaction zone 6 of the reactor 4. The procedure is then repeated.

Figure 2:
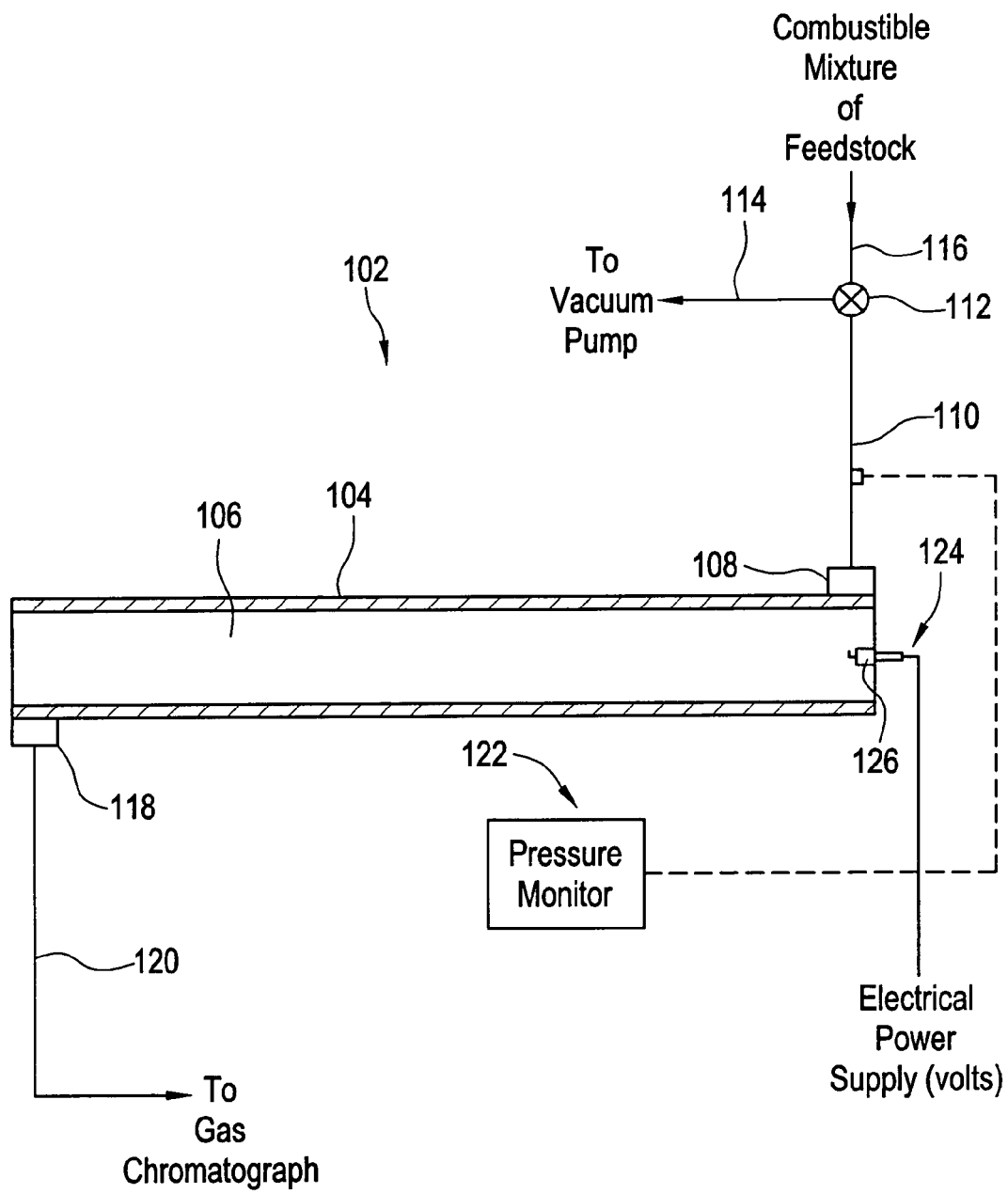
FIG. 2 is a cross-sectional representation of a second embodiment of the apparatus according to the present invention.

Referring to FIG. 2, an alternative arrangement for a reactor according to the present invention is shown. The basic arrangement of the apparatus of FIG. 2 is similar to that of FIG. 1. Thus, the apparatus, generally indicated as 102, comprises a reactor 104 formed from a single length of pipe. Unlike the reactor of the arrangement of FIG. 1, the reactor 104 of FIG. 2 comprises a single reaction zone 106, with no distinct separation between the reactor and driver portions.

An inlet 108 is provided at one end of the reactor 104, connected by a line 110 to a three-way valve 112. A line 114 leads from the valve 112 to a vacuum pump (not shown), by which the reaction zone 106 can be evacuated. A further line 116 leads from the valve 112 to a reservoir of a combustible mixture comprising the feedstock to be converted. An outlet 118 is provided in the second end of the reactor 104, through which products can be withdrawn and led, via a line 120 to a gas chromatograph (not shown). Pressure is monitored on the feed gas inlet line 110 by an arrangement, generally indicated as 122, substantially as described above with reference to FIG. 1.

An ignition system for the contents of the reaction zone 106 is in place in the end of the reactor 104 adjacent the inlet 108. The ignition system is generally indicated as 124, comprises a spark plug 126 and is substantially as described above with reference to FIG. 1.

In operation, the following procedure is followed with the apparatus of FIG. 2.

The entire reactor 104, is evacuated by means of the vacuum pump once the valve 112 has been positioned appropriately. The valve 112 is then repositioned, to allow the reactor 104 to be charged with a combustible mixture to the required pressure. A sufficient voltage is applied to the spark plug 126 to generate a spark across the terminals, thereby igniting the charge of combustible mixture in the reactor 104. The ignition of the combustible mixture generates a wave of elevated temperature and pressure, which passes along the reaction zone 106 of the reactor 104. The product gas is sampled through connection 118 and line 120 for analysis by the gas chromatograph. The procedure is then repeated.

The embodiments of the present invention shown in FIGS. 1 and 2 and described above may be operated repeatedly, with successive charging and ignition of the relevant portions of the reactor. In this way, large volumes of feedstock may be converted. However, it is highly desirable to operate the process of the present invention in a continuous manner, thus rendering the process practical for operation on a commercial scale. An apparatus for continuous operation is shown in FIG. 3.

Figure 3:
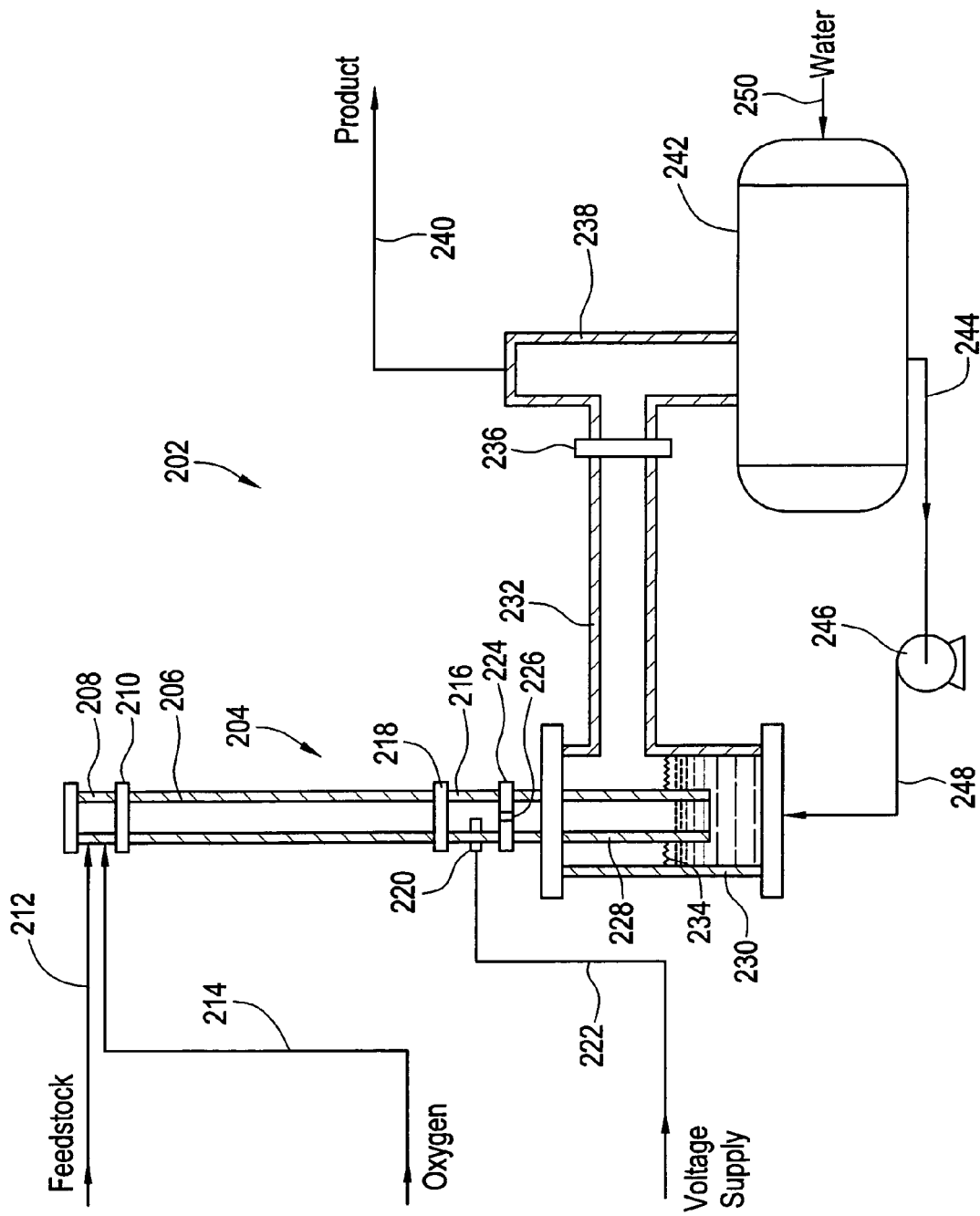
FIG. 3 is a cross-sectional representation of a third embodiment of the apparatus according to the present invention.

Referring to FIG. 3, there is shown an apparatus according to a further aspect of the invention. The apparatus, generally indicated as 202 comprises a reactor assembly, generally indicated as 204. The reactor assembly 204 comprises a reactor body 206 formed from a tube. The reactor may have any suitable diameter and length, provided that the conversion wave is properly initiated and propagated. The reactor body 206 is of stainless steel, although any suitable material capable of withstanding the reaction conditions within the reactor may be employed. The reactor body 206 is shown in FIG. 3 as being generally vertical. However, it will be understood that different orientations of the reactor assembly may be employed, including horizontal.

A reactor head 208 is mounted to the upper end of the reactor body 206 by a flange 210. The reactor head 208 has a feedstock inlet, to which is connected a feedstock feed line 212, through which feedstock to be converted is introduced from a feedstock reservoir (not shown). In the embodiment shown in FIG. 3, a second inlet is present in the reactor head 208 for introducing an oxygen-containing gas via a line 214 from a reservoir (not shown). A combustible mixture of the feedstock and the oxygen-containing gas is formed in the reactor head 208. In alternative embodiment, the reactor head may have a single inlet, in cases where a reactive mixture is prepared before introduction of the feedstock into the reactor, or in cases where the reactive mixture consists of a single reactive feedstock component.

The reactor head may be formed with one or more arrestors or deflectors to absorb or deflect a conversion wave entering the reactor head. The reactor head may also comprise cooling means, such as water cooling, to reduce the temperature of the feed inlets and the portion of the apparatus in which mixing of the feed components takes place.

The reactor body 206 is mounted to the top of an ignition module 216 by a flange 218, the ignition module 216 is a tubular pipe, in the side of which is mounted a spark plug 220 of conventional design. Two or more spark plugs may be employed in the ignition module, as required to initiate the conversion wave within the ignition module 216. An electrical supply is connected to the spark plug 220 by means of a wire 222 and provides sufficient voltage to cause a spark discharge across the electrodes of the spark plug 220 when activated.

The lower end of the ignition module 216 is capped by a restriction plate 224 having an orifice 226 therethrough of significantly lower diameter than the bore of the ignition module 216 and the reactor body 206. The orifice 226 in the restriction plate 224 is sized to allow gas to pass through, but to deflect a conversion wave initiated in the ignition module 216 up into the reactor body 206. The restriction plate 224 also has the effect of moderating the pressure pulses generated by the generation of the conversion wave on the downstream equipment.

A dip pipe 228 extends from the restriction plate 224 down into a seal pot 230 of generally tubular construction. The seal pot 230 has an outlet pipe 232 at one side. Water is present in the seal pot to a level 234 at approximately the level of the outlet pipe 232. The open end of the dip pipe 228 extends below the level 234 of the water in the seal pot 230. A hole (not show) in the side of the dip pipe 228 establishes a normal liquid/gas interface level within the dip pipe 228.

The outlet pipe 232 of the seal pot 230 is connected by a flange 236 to a side inlet of a disengaging pipe 238. The disengaging pipe 238 is arranged generally vertically and has a gas outlet at its upper end connected to a product line 240. The lower end of the disengaging pipe 238 opens into a recirculation tank 242. A line 244 leads from the lower portion of the recirculation tank 242 to a pump 246, which operates to return water from the recirculation tank 242 to the seal pot 230 via line 248. Fresh water to replace any water lost in the product gas stream or withdrawn is added to the system through a line 250.

The apparatus 202 of FIG. 3 operates as follows:

Feedstock to be converted and, if necessary, an oxygen-containing gas are continuously supplied to the reactor head 208 by feed lines 212 and 214. A reactive mixture is thus formed in the reactor head and proceeds to fill the reactor body 206 from the top down until the entire reactor body 206 and the ignition module 216 are filled with reactive mixture. The electrical supply is activated, causing a spark discharge across the electrodes of the spark plug 220 in the ignition module 216, causing the reactive mixture to ignite and initiate a conversion wave. The conversion wave is deflected off the restriction plate 224 and travels up through the reactive mixture in the reactor body 206 and reactor head 208.

The continuous supply of fresh components to the reactor head 208 forces the converted components in the reactor body 206 and the ignition module 216 out through the orifice 226 in the restriction plate 224 and fills the reactor body 206 and ignition module 216 with a fresh charge of reactants. At this point, the electrical supply is again activated, initiating a further conversion wave in the ignition module 216 and the events described above are repeated. The activation of the electrical supply may be timed to coincide with the arrival of a fresh charge of reactive components in the ignition module 216. More conveniently, the electrical supply is activated at a frequency significantly higher than the frequency with which the reactor body 206 and ignition module 216 are filled with fresh reactive components, thereby simplifying the control procedures and ensuring that no unreacted components leave the reactor body 206 and ignition module 216.

The converted components leaving the ignition module 216 through the orifice 226 in the restriction plate 224 enter the dip pipe 228 and pass into the seal pot 230. The converted components leave the open end of the dip pipe 228 and pass through the water in the seal pot 230, exiting through the outlet pipe 232 to enter the disengaging tube 238. Entrained water falls into the recirculation tank 242, while the gaseous products leave the top of the disengaging tube 238 through line 240.

Water entrained by the flow of converted components and collected in the recirculation tank is returned to the seal pot by the pump 246 through lines 244 and 248.

The ignition module shown in FIG. 3 employs spark generation as the source of ignition for the reactive mixture. As already noted, it is preferred that the spark ignition source is generated at a high frequency, to ensure efficient conversion of the feedstock. As an alternative, the ignition source may be constant, such as one or more heated elements or other source of localized high temperature.

Figure 4:
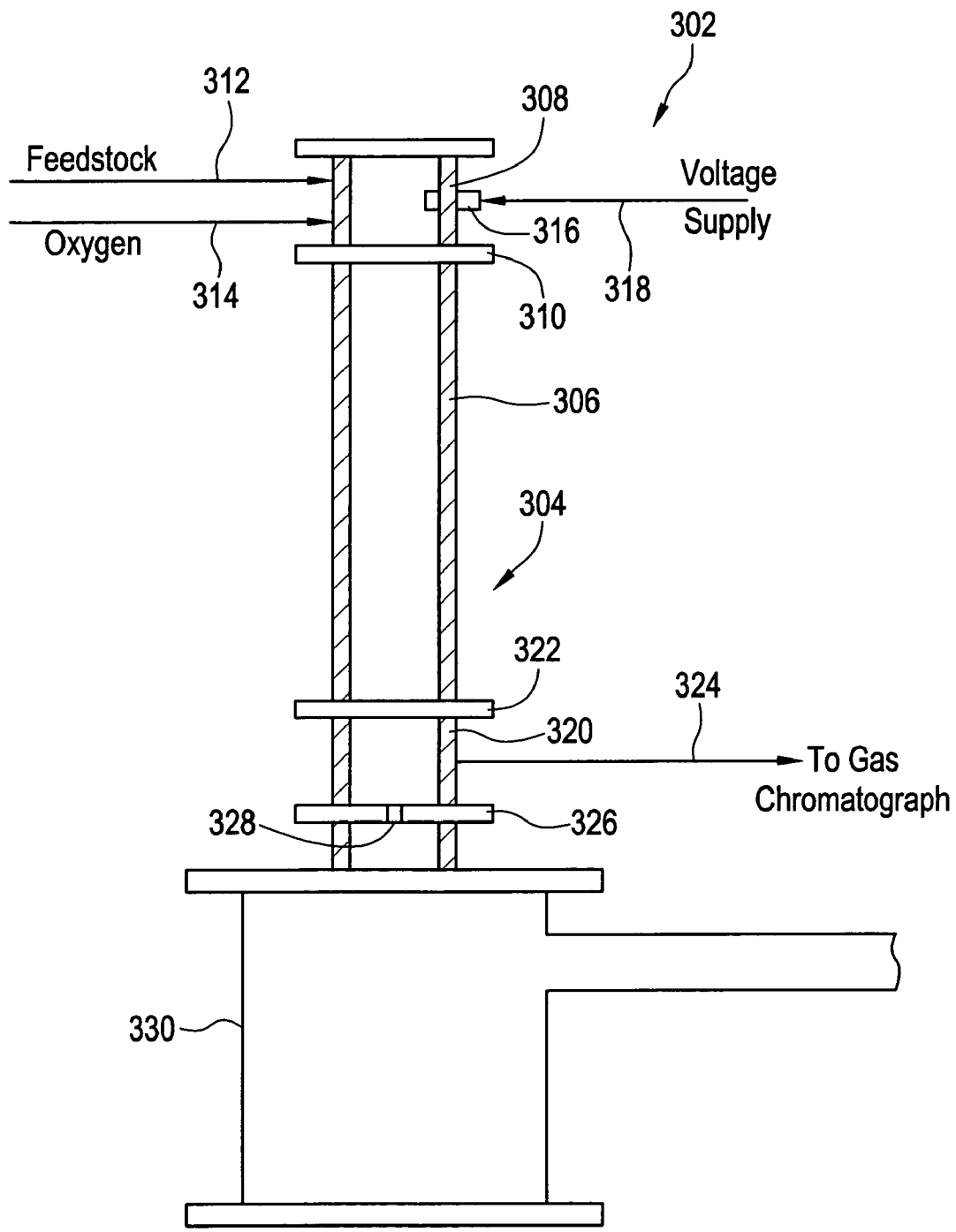
FIG. 4 is a cross-sectional representation of a fourth embodiment of the apparatus according to the present invention.

Referring to FIG. 4, there is shown an apparatus according to a further aspect of the invention. The apparatus of FIG. 4, generally indicated as 302 is of the same basic design as that of FIG. 3. The apparatus 302 comprises a reactor assembly, generally indicated as 304. The reactor assembly 304 comprises a reactor body 306 formed from a tube. The reactor may have any suitable diameter and length, provided that the conversion wave is properly initiated and propagated. The reactor body 306 is of stainless steel, although any suitable material capable of withstanding the reaction conditions within the reactor may be employed. The reactor body 306 is shown in FIG. 4 as being generally vertical. However, it will be understood that different orientations of the reactor assembly may be employed, including horizontal.

A reactor head 308 is mounted to the upper end of the reactor body 306 by a flange 310. The reactor head 308 has a feedstock inlet, to which is connected a feedstock feed line 312, through which feedstock to be converted is introduced from a feedstock reservoir (not shown). In the embodiment shown in FIG. 4, a second inlet is present in the reactor head 308 for introducing an oxygen-containing gas via a line 314 from a reservoir (not shown). A combustible mixture of the feedstock and the oxygen-containing gas is formed in the reactor head 308. In an alternative embodiment, the reactor head may have a single inlet, in cases where a reactive mixture is prepared before introduction of the feedstock into the reactor, or in cases where the reactive mixture consists of a single reactive feedstock component.

The reactor head may comprise cooling means, such as water cooling, to reduce the temperature of the feed inlets and the portion of the apparatus in which mixing of the feed components takes place.

The reactor head is provided with a conventional spark plug 316 connected by an electrical cable 318 to a voltage supply (not shown). The voltage supply is operated to generate a spark across the electrodes of the spark plug 316 at a frequency such that the reactor is from 70 to 100% filled with fresh reactive mixture. Two or more spark plugs may be employed in the reactor head 308, as required to initiate the conversion wave within the reactor.

The reactor body 306 is mounted to the top of a sampling module 320 by a flange 322. The sampling module 320 is a tubular pipe, in the side of which is formed a sample outlet, from a sample line 324 leads to a gas chromatograph of known design (not shown). The lower end of the sample module 320 is capped by a restriction plate 326 having an orifice 328 therethrough of significantly lower diameter than the bore of the ignition module 320 and the reactor body 306. The restriction plate 326 has the effect of moderating the pressure pulses generated by the generation of the conversion wave on the downstream equipment.

The reactor assembly 304 is mounted on a seal pot 330 having a dip pipe and outlet arrangement as described above with respect to the apparatus shown in FIG. 3. For reasons of clarity, these details have been omitted from FIG. 4.

In operation, the apparatus of FIG. 4 is operated in a manner similar to that described above with respect to FIG. 3. However, the conversion wave is initiated in the reactor head 308 by means of the spark plug 316 and voltage supply.

The conversion wave, once generated, travels from the reactor head 308 to the restriction plate 326 at the outlet end of the sampling module 320, where the effects of the wave are damped. As noted, the frequency of spark generation at the spark plug 316 is such that the initiation of the reaction to generate the conversion wave in the reactor head 308 occurs when the reactor body is at least 70% filled with fresh mixture. This may be determined from the flowrate of the reactive mixture through the reactor body. As the conversion wave may be initiated at any time after the reactor head 308 has been filled with fresh reactive mixture, the timing of the conversion wave in the apparatus of FIG. 4 may be varied. This represents an advantage in this embodiment, as a process scheme operating with a plurality of reaction modules of the design of FIG. 4 may be operated such that the conversion waves are staggered, thus smoothing the shock effects of the individual waves and reducing the overall stress generated on the apparatus and ancillary equipment.

Figure 5:
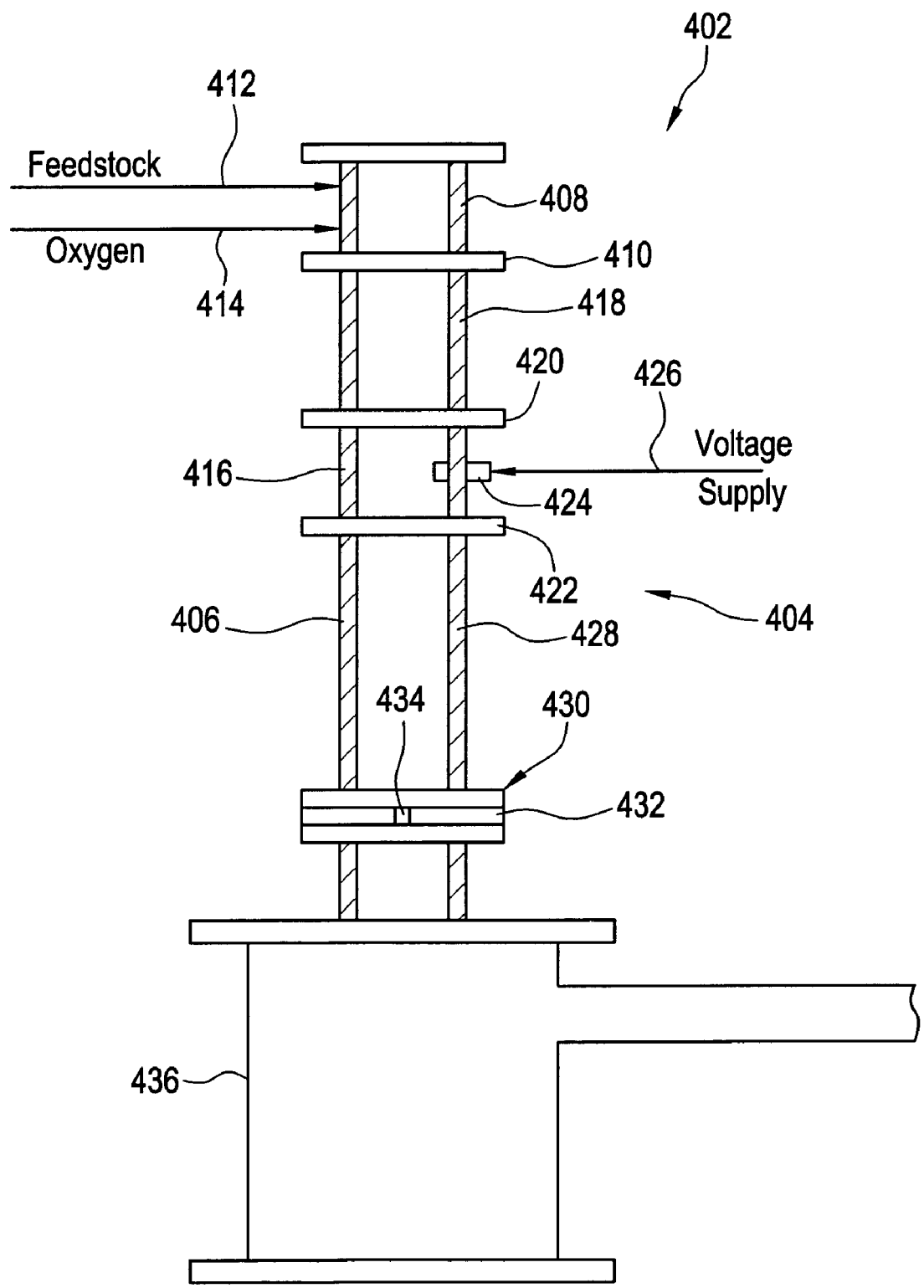
FIG. 5 is a cross-sectional representation of a fifth embodiment of the apparatus according to the present invention.

Turning now to FIG. 5, there is shown a further embodiment of the present invention. The apparatus of FIG. 5, generally indicated as 402, is of the same basic design as that of FIG. 3. The apparatus 402 comprises a reactor assembly, generally indicated as 404, comprising a reactor body 406 formed from a tube. The reactor body may have any suitable diameter and length, provided the conversion wave is properly initiated and propagated through the mixture to be converted. As with the reactor assembly of FIG. 3, the reactor assembly 404 is formed of stainless steel, although any suitable material capable of withstanding the conditions prevailing in the reactor during operation may be employed. The reactor body 406 is shown in FIG. 5 as being generally vertical. However, it will be understood that different orientations of the reactor may by employed, including horizontal.

A reactor head 408 is mounted to the upper end of the reactor body 406 by a flange 410. The reactor head has a feedstock inlet, to which is connected a feedstock feed line 412, through which feedstock to be converted is introduced into the reactor from a feedstock reservoir (not shown in FIG. 5 for clarity). A second feed line 414 is provided to supply oxygen to the reactor head 408. A combustible mixture of feedstock and oxygen is formed in the reactor head 408 during operation. In an alternative to the arrangement shown in FIG. 5, the feedstock and oxygen may be mixed upstream of the reactor head 408 and a single feed line to the reactor provided. A single feed line is also employed in the case of a single reactive component being converted in the reactor.

The reactor head may comprise cooling means, such as water cooling, to reduce the temperature of the feed inlets and the portion of the apparatus in which mixing of the feed components takes place.

An ignition module 416 is provided. The ignition module 416 is separated from the reactor head by an upper reactor portion 418. The ignition module comprises upper and lower flanges 420 and 422. The ignition module further comprises a spark plug 424, connected to an electrical supply (not shown) by means of a cable 426. The arrangement shown in FIG. 5 has a single spark plug 424 in the ignition module. However, it will be appreciated that additional spark plugs may also be provide within the ignition module. The electrical supply is operated such that an electrical discharge is caused to occur across the electrodes of the spark plug when the reactor is from 70% to 100% filled with fresh reactive mixture.

A lower reactor portion 428 extends below the ignition module to a reactor outlet assembly 430. The reactor outlet assembly comprises a restriction plate 432 having an orifice 434 therein of significantly lower diameter than the diameter of the reactor body. The restriction plate has the effect of moderating the pressure pulses generated by the initiation of the conversion wave on the downstream equipment.

If required, the reactor outlet assembly of FIG. 5 may be replaced by a sample module, such as shown in FIG. 4 and described hereinbefore.

The reactor assembly 404 is mounted on a seal pot 436 having a dip pipe and outlet arrangement as described above with respect to the apparatus shown in FIG. 3. For reasons of clarity, these details have been omitted from FIG. 5.

In operation, the apparatus of FIG. 5 is operated in a manner similar to that described above with respect to FIG. 3. However, the conversion wave is initiated in the ignition module 416 by means of the spark plug 424 and voltage supply. The conversion wave, once generated, extends outwards from the ignition module within the reactor. A first wave portion travels upwards from the ignition module 416, through the upper reactor portion 418 towards the reactor head 408. A second wave portion travels downwards from the ignition module 416 through the lower reactor portion 428 to the reactor outlet assembly 430. As noted, the frequency of spark generation at the spark plug 424 is such that the initiation of the reaction to generate the conversion wave in the ignition module occurs when the reactor body is at least 70% filled with fresh mixture. This may be determined from the flowrate of the reactive mixture through the reactor body. As the conversion wave may be initiated at any time after the ignition module 416 has been filled with fresh reactive mixture, the timing of the conversion wave in the apparatus of FIG. 5 may be varied. This represents an advantage in this embodiment, as a process scheme operating with a plurality of reaction modules of the design of FIG. 5 may be operated such that the conversion waves are staggered, thus smoothing the shock effects of the individual waves and reducing the overall stress generated on the apparatus and ancillary equipment.

It has also been found that spacing the ignition module at some distance from the reactor head and inlets, as shown in FIG. 5, reduces the tendency of the reactor head and inlets to overheat. This in turn reduces the tendency of the feedstock to spontaneously ignite and combust upon entering the reactor head, improving both the efficiency and degree of control of the reactor and the conversion.

Figure 6:
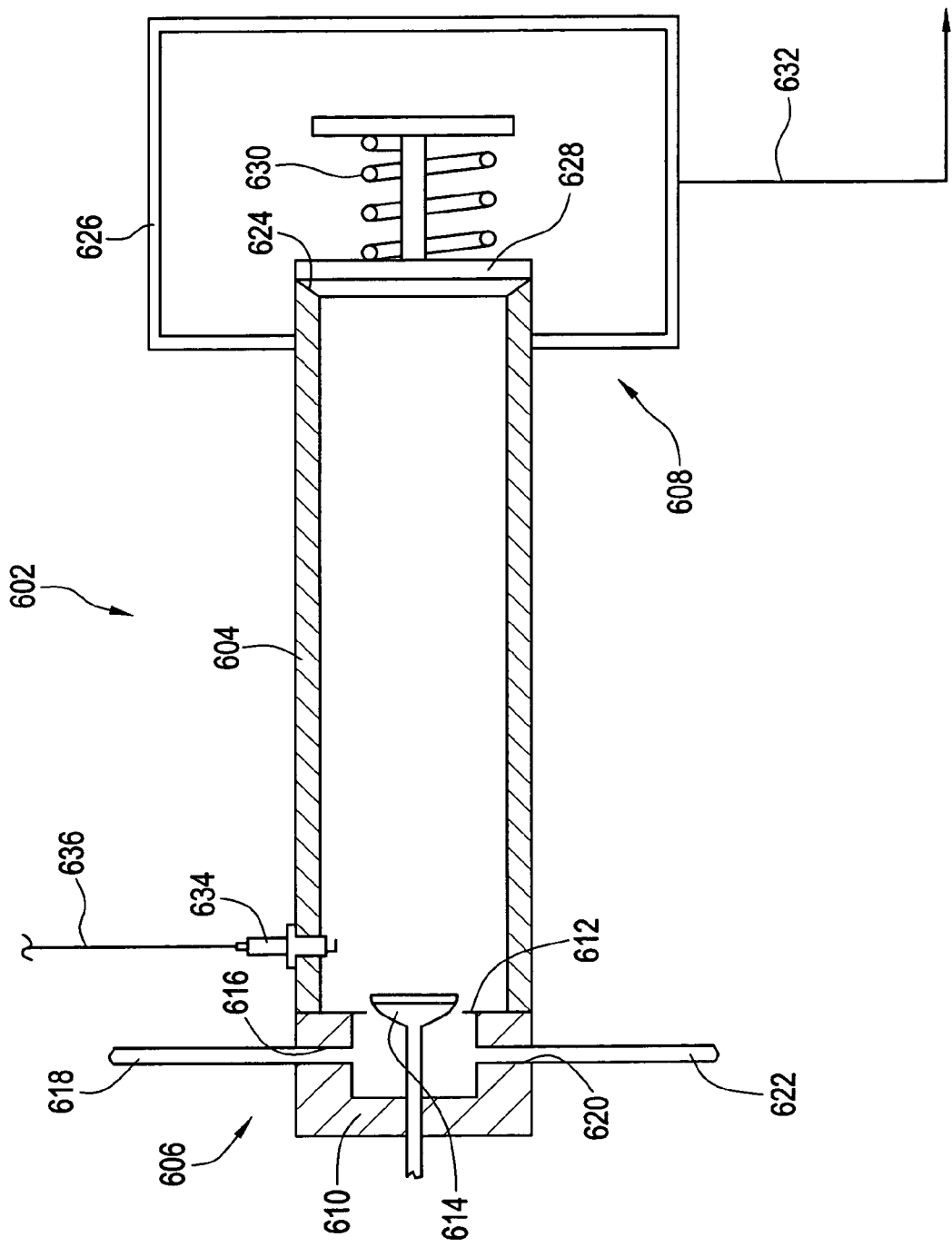
FIG. 6 is a cross-sectional representation of a sixth embodiment of the apparatus according to the present invention in a first operating position.

Turning now to FIG. 6, there is shown a reactor assembly, generally indicated as 602, comprising a tubular reactor 604. The reactor 604 is of any suitable material capable of withstanding the conditions prevailing within the reactor during operation, preferably stainless steel. The reactor 604 has an inlet end, generally indicated as 606, and an outlet end, generally indicated as 608. The reactor is provided at its inlet end 604 with a mixing head 610 of generally cylindrical construction with a closed end. An opening 612 in the reactor head 610 provides communication with the interior of the reactor 604. An inlet valve 614 is provided to close and seal the opening 612. The reactor head 610 is provided with a first inlet 616 for a feedstock to be converted, connected to a reservoir of feedstock (not shown) by a line 618. A second inlet 620 is provided in the reactor head 610, connected to a reservoir of oxygen (not shown) by a line 622. The reactor head may be provided with more inlets, depending upon the nature of the components to be converted. In the case of a reactive feedstock requiring no further components, a single inlet may be provided.

As shown in FIG. 6, the inlet valve 614 is open. The inlet valve 614 may be operated by any suitable means to open and close the opening 612. Preferably, the opening and closing of the valve is coordinated with the contents of the reactor 604, such that the inlet valve 614 is opened for a sufficient period of time to allow the reactor to become partially or wholly filled by a mixture of fresh feedstock and oxygen. The inlet valve may be opened for a shorter period of time, as required, in order to obtain efficient operation of the reactor.

The reactor 604 is provided at its outlet end with an opening 624 communicating with a high pressure product receiver 626. An outlet valve 628 opens and closes the opening 624. The outlet valve 628 is held in the closed position, shown in FIG. 6, by a spring 630. Sufficient force acting on the outlet valve 628 as a result of high pressure within the reactor 604 will open the valve against the biasing action of the spring 630. This position is shown in FIG. 7. It will appreciated that other forms of mechanism for opening the outlet valve under the action of high pressure within the reactor may also be provided.

A product outlet line 632 allows high pressure product to leave the receiver 626.

An ignition system for initiating a reaction within the reactor 604 comprises a spark plug 634 extending through a bore in the reactor 604 and connected by a cable 636 to a electrical high voltage supply (not shown for clarity). FIGS. 6 and 7 show a single spark plug. However, two or more such spark plugs may be provided, as required in order to initiate the reaction. The spark plug 634 is shown in FIG. 6 to be adjacent the inlet end 606 of the reactor 604. The positioning of the spark plug in the reactor may vary from this, for example by being distanced from both the inlet end 606 and the outlet end 608.

The operation of the reactor assembly shown in FIGS. 6 and 7 proceeds as follows:

With the reactor assembly as shown in FIG. 6, feedstock to be converted and oxygen are fed to the reactor head 610 through lines 618 and 622 respectively. The two components are mixed within the reactor head 610, before passing through the opening 612 into the interior of the reactor 604. Once sufficient mixture has been fed to the reactor in this way, for example when the reactor is substantially filled, the inlet valve 614 is closed, thus isolating the reactor 604 from the reactor head 610. A voltage is supplied to the spark plug 634 sufficient to generate a spark and initiate a reaction in the mixture in the region of the spark plug. This reaction propagates through the reactor 604 in the form of a high pressure conversion wave. The action of the conversion wave on the inlet valve 614 is to force it closed, thus improving the seal at the inlet end 606 of the reactor 604. Once the conversion wave reaches the outlet end 608 of the reactor 604, sufficient pressure is provided to move the outlet valve 628 against the action of the spring 630, as shown in FIG. 7, allowing the high pressure converted products to flow into the receiver 626. As the conversion wave leaves the reactor 604 past the outlet valve 628, a region of low pressure or partial vacuum is formed within the reactor. As the pressure within the reactor 604 falls, the outlet valve 628 is closed under the biasing action of the spring 630. With the interior of the reactor 604 under a partial vacuum, the inlet valve 614 is opened. The partial vacuum within the reactor 604 aids the flow of fresh reactive mixture into the reactor 604 from the reactor head 610. The process is then repeated.

High pressure product is withdrawn from the receiver through line 632.

The apparatus of the present invention in its several embodiments is a robust design, which may be applied on any desired scale. This may be achieved by adjusting the dimensions of the various components, for example the reactors. Alternatively, the apparatus of the present invention is very suited to scaling up on a modular basis, whereby two or more reactors are employed, as required to meet the demands of throughput and conversion.

The embodiments of the present invention will now be further described, for illustrative purposes only, by way of the following specific examples.

EXAMPLES

Examples of embodiments of the present invention are as follows.

Example 1

The apparatus shown in FIG. 1 was employed in a series of runs to convert a feedstock of methane using the general procedure set out above. The operating conditions and results of the various runs are set out in Table 1 below.

TABLE 1

|  | Experiment No. | | | | |
| --- | --- | --- | --- | --- | --- |
|  | 1 | 2 | 3 | 4 | 5 |
| Reactor Diameter (in) | 2 | 2 | 2 | 4 | 4 |
| Reactor portion length (in) | 120 | 192 | 192 | 120 | 120 |
| Driver portion length (in) | 18 | 18 | 18 | 18 | 18 |
| Reactor and Driver initial pressure (psia) | 45 | 45 | 45 | 15 | 45 |
| Ratio of $O_2$ to $CH_4$ in Driver portion | 67/33 | 67/33 | 67/33 | 67/33 | 67/33 |
| Ratio of $O_2$ to $CH_4$ in Reactor portion | 40.4/59.6 | 38.8/61.2* | 41.9/58.1 | 39.5/60.5* | 41.6/58.4 |
| Final pressure within Reactor (psia) | 50 | 48.2 | 66.8 | 17.1 | 66.4 |
| $CH_4$ conversion (% vol) | 95.9 | 69.6 | 98.1 | 79.7 | 98.6 |
| $O_2$ conversion (% vol) | 100 | 98.5 | 100 | 100 | 100 |
| Ratio of $H_2$ to CO in product | 1.9 | 2.1 | 1.9 | 1.9 | 1.9 |
| Ratio of CO to $CO_2$ in product | 6.7 | 4.1 | 7.7 | 4.9 | 7.5 |

*mixture was not flammable

As can be seen in Table 1, the process achieved a particularly high conversion of both methane and oxygen, when the reactor portion was charged with a mixture comprising the methane feedstock mixed with oxygen within the flammability limits. The conversion of both methane and oxygen was reduced when the ratio of methane to oxygen in the reactor portion fell outside the limits of flammability of the two component mixture.

The process exhibited a high selectivity to carbon monoxide, with the ratio of carbon monoxide to carbon dioxide in the product gas being particularly high. Again, the selectivity of the process to carbon monoxide over carbon dioxide was reduced as the flammability limit of the methane/oxygen mixture was exceeded in the reaction portion of the reactor.

Example 2

The apparatus of FIG. 2 was employed to demonstrate the conversion of methane in a driver-less reactor. The operating conditions of the experiment and the results are set out in Table 2 below.

TABLE 2

|  | Experiment No. 6 |
| --- | --- |
| Reactor Diameter (in) | 2 |
| Reactor portion length (in) | 120 |
| Driver portion length (in) | None |
| Reactor and Driver initial pressure (psia) | 45 |
| Ratio of $O_2$ to $CH_4$ in Driver portion | N/A |
| Ratio of $O_2$ to $CH_4$ in Reactor portion | 43.9/56.1 |
| Final pressure within Reactor (psia) | 62 |
| $CH_4$ conversion (% vol) | 99.97 |

TABLE 2-continued

|  | Experiment No. 6 |
| --- | --- |
| $O_2$ conversion (% vol) | 100 |
| Ratio of $H_2$ to CO in product | 1.7 |
| Ratio of CO to $CO_2$ in product | 10.4 |

As can be seen in Table 2, the process achieved a particularly high conversion of both methane and oxygen, when the reactor portion was charged with a mixture comprising the methane feedstock mixed with oxygen within the flammability limits, with virtually all the methane and all the oxygen being converted.

The process exhibited a high selectivity to carbon monoxide, with the ratio of carbon monoxide to carbon dioxide in the product gas being particularly high.

Example 3

The apparatus of FIG. 3 was used to convert methane as the feedstock. Oxygen was used as the oxygen-containing gas. The reactor body employed had a nominal internal diameter of 2 inches and a length of 10 feet. The reactor head comprised a mixing head connected to the methane and oxygen inlets. The mixing head was tubular with a nominal internal diameter of 0.75 inches and a length of 1 inch.

The operating conditions and results are set out in Table 3 below.

TABLE 3

|  | Experiment No. 7 |
| --- | --- |
| Reactor Body Diameter (in) | 2 |
| Reactor Body Length (in) | 120 |
| Feed pressure (psia) | 15 |
| Oxygen feed rate (cc/sec) | 380 |
| Methane feed rate (cc/sec) | 500 |
| Oxygen content of reactive mixture (%) | 42.9 |
| Methane content of reactive mixture (%) | 57.1 |
| Firing frequency (time between successive conversion waves, sec) | 7 |
| Methane conversion (%) | 97.6 |
| Oxygen conversion (%) | 100.0 |
| Ratio $H_2$:CO in product | 1.84 |
| Ratio CO:$CO_2$ in product | 10.4 |

The results set out in Table 3 indicate that the process achieved a very high conversion of methane and total conversion of oxygen. The product gas contained a very high concentration of hydrogen and carbon monoxide, with the ratio of hydrogen to carbon monoxide being almost 2. The selectivity of the process to the partial oxidation of methane to carbon monoxide is demonstrated by the very high ratio of carbon monoxide to carbon dioxide in the product gas.

As an additional product, the process produced a small amount of carbon. The apparatus of FIG. 3 collects this carbon in the water circulated between the seal pot and the recirculation tank. The water/carbon mixture may be withdrawn from the recirculation tank and the carbon separated as a commercially viable product. Fresh water is then added to the recirculation tank to make up the lost volume of water.

Example 4

The apparatus of FIG. 4 is used to convert methane as the feedstock. Oxygen is used as the oxygen-containing gas. The reactor body has a nominal internal diameter of 2 inches and a length of 10 feet. The reactor head comprises a single spark plug, operable to produce a spark and ignite the methane/oxygen mixture in the reactor head when the reactor body is at least 70% filled with fresh reactive mixture.

The operating conditions and results achievable with this arrangement are in line with those described in Example 3.

While specific embodiments of the present invention have been described and illustrated, it is to be understood that these are provided by way of example only and that the invention is not to be construed as being limited thereto. Variations and modifications may be made to the embodiments described and shown herein without departing from the spirit of the present invention.

What is claimed is:

1. A process for the conversion of a feedstock, comprising:
preparing a reactive mixture comprising the feedstock;
feeding the reactive mixture to a reaction zone;
initiating a reaction in the reactive mixture, thereby generating a transient conversion wave of increased temperature and increased pressure;
allowing the transient conversion wave to pass through the reactive mixture present in the reaction zone;
recovering at least partially converted feedstock from the reaction zone; and
passing the converted feedstock through an energy absorber.

2. The process as claimed in claim 1, wherein the transient conversion wave is generated periodically.

3. The process as claimed in claim 2, wherein the generation of each transient conversion wave is timed to occur when the reaction zone is from 70 to 100% filled with fresh reactive mixture.

4. The process as claimed in claim 3, wherein the generation of each transient conversion wave is triggered by the reaction zone being from 70 to 100% filled with unconverted feedstock.

5. The process as claimed in claim 1, wherein the feedstock comprises components that are selected from normally gaseous components, vapourised components, aerosol components and finely divided solid components.

6. The process as claimed in claim 1, wherein the feedstock comprises a hydrocarbon.

7. The process as claimed in claim 6, wherein the hydrocarbon is a normally gaseous hydrocarbon.

8. The process as claimed in claim 7, wherein the hydrocarbon is a lower alkane.

9. The process as claimed in claim 8, wherein the hydrocarbon is methane.

10. The process as claimed in claim 6, wherein the feedstock is selected from the group consisting of natural gas, associated gas, refinery gas arid gas produced by the microbial digestion of biomass.

11. The process as claimed in claim 1, wherein the feedstock is combined with an oxygen-containing gas to form the reactive mixture.

12. The process as claimed in claim 11, wherein the reactive mixture is combustible.

13. The process as claimed in claim 12, wherein the reaction is initiated in the reactive mixture by igniting the mixture.

14. The process as claimed in claim 1, wherein the reactive mixture is a combustible mixture.

15. The process as claimed in claim 14, wherein the transient conversion wave is generated by igniting the combustible mixture.

16. The process as claimed in claim 15, wherein a constant source of ignition is provided, the transient conversion wave being generated when the mixture in the region of the ignition source is a combustible mixture.

17. The process as claimed in claim 15, wherein a source of ignition is provided periodically, the time between successive ignition sources being less than the time taken for fresh reactive mixture to completely charge the reaction zone.

18. The process as claimed in claim 1, wherein the reaction zone has an inlet and an outlet, the reactive mixture being supplied to the inlet of the reaction zone, the reaction being initiated in the region of the outlet to the reaction zone.

19. The process as claimed in claim 1, wherein the reaction zone has an inlet and an outlet, the reactive mixture being supplied to the inlet of the reaction zone, the reaction being initiated in the region of the inlet to the reaction zone.

20. The process as claimed in claim 1, wherein the reactive mixture is fed continuously to the reaction zone.

21. The process of claim 1, wherein the energy absorber is selected from a water bath and a water spray.

22. The process of claim 1, wherein recovery of the at least partially converted feedstock from the reaction zone is effected by opening a valve in the reaction zone.

23. The process of claim 22, wherein the valve is opened under the action of the conversion wave.

24. The process claimed in claim 1, further comprising:
continuously feeding the reactive mixture to an inlet of the reaction zone, the reaction zone having an outlet spaced from the inlet; and
continuously removing converted feedstock from the outlet of the reaction zone.

25. A process for the conversion of a feedstock comprising methane and oxygen, the process comprising:
forming a combustible mixture comprising methane and oxygen;
feeding the combustible mixture to an inlet of a reaction zone, the reaction zone having an outlet spaced from the inlet;
providing a source of ignition in the reaction zone;
allowing the source of ignition to ignite the combustible mixture, thereby generating a combustion wave;
allowing the combustion wave to travel through the reaction zone;
removing converted feedstock from the outlet of the reaction zone; and
passing the converted feedstock through an energy absorber to produce a treated product stream.

26. The process claimed in claim 1, further comprising:
stopping the feed of the combustible mixture; and
allowing the transient combustion wave to open a valve in the outlet of the reaction zone.

27. An apparatus for the conversion of a reactive feedstock, the apparatus comprising:
a reaction zone having an inlet and an outlet;
an initiator of a reaction in the reactive mixture in the reaction zone; and
a vessel for containing a liquid, wherein components leaving the reaction zone are caused to pass into a dip pipe extending into the vessel, the vessel having an outlet and the dip pipe extending into the vessel to below the outlet.

28. The apparatus as claimed in claim 27, wherein the inlet of the reaction zone comprises a mixing zone for the reactive feedstock.

29. The apparatus as claimed in claim 27, wherein the initiator of the reaction is adjacent the inlet of the reaction zone.

30. The apparatus as claimed in claim 27, wherein the initiator of the reaction is adjacent the outlet of the reaction zone.

31. The apparatus as claimed in claim 30, wherein the initiator is in an initiator module, the module having an inlet and an outlet, the inlet of the module being in flow connection with the outlet of the reaction zone.

32. The apparatus as claimed in claim 27, wherein the reactive mixture is a combustible mixture, the initiator being a source of ignition for the reactive mixture.

33. The apparatus as claimed in claim 32, wherein the initiator generates an electrical discharge.

34. The apparatus as claimed in claim 27, wherein the initiator is operable periodically at intervals no longer than the time taken for the feedstock to pass from the inlet of the reaction zone to the outlet of the reaction zone.

35. The apparatus as claimed in claim 27, further comprising a restriction downstream of the outlet of the reaction zone.

36. The apparatus as claimed in claim 35, wherein the initiator is housed within an initiator module having an inlet and an outlet, the inlet of the initiator module being in communication with the outlet of the reaction zone, the restriction being adjacent the outlet of the initiator module.

37. The apparatus as claimed in claim 27, further comprising a disengager capable of separating gaseous and liquid components leaving the vessel.

38. The apparatus as claimed in claim 37, wherein a recycle system is provided to recycle liquid recovered in the disengager vessel.

39. The apparatus as claimed in claim 27, further comprising a vessel, wherein components leaving the outlet of the reaction zone are caused to pass into the vessel, the vessel comprising an inlet for a liquid spray, such that components entering the vessel are caused to contact the liquid spray.

40. The apparatus as claimed in claim 39, further comprising a disengager capable of separating gaseous and liquid components leaving the vessel.

41. The apparatus as claimed in claim 40, wherein a recycle system is provided to recycle liquid recovered in the disengager to the vessel.

42. The apparatus as claimed in claim 27, wherein the reactor comprises an inlet valve at the inlet of the reaction zone and an outlet valve at the outlet of the reaction zone.

43. The apparatus as claimed in claim 42, wherein the outlet valve is openable under the action of a conversion wave generated within the reaction zone.

44. The apparatus as claimed in claim 43, further comprising a high pressure product receiver in communication with the outlet of the reaction zone.

45. An apparatus for the conversion of a reactive feedstock, the apparatus comprising:
a reactor comprising a first inlet for the feedstock and a second inlet for an oxygen-containing gas;
a mixing zone for mixing the feedstock and the oxygen-containing gas to form a combustible mixture thereof;
a reaction zone having an inlet and an outlet, the inlet of the reactor zone being in communication with the outlet of the mixing zone;
an initiator zone comprising an ignition source capable of igniting the combustible mixture and operable at a frequency such that the time between successive operations of the ignition source is less than the time taken for the combustible mixture to travel from the inlet of the reaction zone to the outlet of the reaction zone; and
a constriction downstream of the initiator and reaction zones.

46. An apparatus for the conversion of a reactive feedstock, the apparatus comprising:
a reactor comprising a first inlet for the feedstock and a second inlet for an oxygen-containing gas;
a mixing zone for mixing the feedstock and the oxygen-containing gas to form a combustible mixture thereof;
a reaction zone having an inlet and an outlet, the inlet of the reactor zone being in communication with the outlet of the mixing zone;

an inlet valve at the inlet of the reactor zone for controlling the flow of the combustible mixture into the reactor zone;

an initiator comprising an ignition source capable of igniting the combustible mixture within the reactor zone;

an outlet valve at the outlet of the reactor zone openable at a predetermined elevated pressure within the reactor zone;

a high pressure product receiver in communication with the outlet valve.

47. A process for the conversion of a combustible feedstock, comprising:

providing a first combustible mixture comprising the feedstock to a reaction zone;

providing a second combustible mixture comprising the feedstock to a driver zone;

igniting the first combustible mixture in the driver zone, thereby generating a conversion wave of elevated temperature and pressure;

allowing the conversion wave to enter and pass through the reaction zone; and recovering at least partially converted feedstock from the reaction zone.

48. The process as claimed in claim 47, wherein the reaction zone is isolated from the driver zone until the conversion wave is generated in the driver zone.

49. The process as claimed in claim 48, wherein the reaction zone is isolated from the driver tone by a closure member.

50. The process as claimed in claim 47, wherein the first and second combustible mixtures have substantially the same composition.

51. The process as claimed in claim 47, wherein the feedstock comprises components selected from normally gaseous components, vaporized components, aerosol components, and finely divided solid components.

52. The process as claimed in claim 47, wherein the feedstock is a hydrocarbon.

53. The process as claimed in claim 52, wherein the hydrocarbon is a normally gaseous hydrocarbon.

54. The process as claimed in claim 53, wherein the normally gaseous hydrocarbon is a lower alkane.

55. The process as claimed in claim 47, wherein the feedstock is a mixture of hydrocarbons.

56. The process as claimed in claim 55, wherein the feedstock is selected from the group consisting of natural gas, refinery gas, associated gas, and gas produced by the microbial digestion of biomass.

57. The process as claimed in claim 47, wherein the second combustible mixture has a composition that is within 10% of the flammable limit of the component mixture, based upon the feedstock-content of the mixture.

58. The process as claimed in claim 57, wherein the second combustible mixture has a composition that is within 5% of the flammable limit of the component mixture, based upon the feedstock-content of the mixture.

59. The process as claimed in claim 47, wherein the first combustible mixture comprises an oxygen-containing component selected from the group consisting of oxygen, air and an oxygen-containing compound.

60. The process as claimed in claim 47, wherein the second combustible mixture comprises an oxygen-containing component selected from the group consisting of oxygen, air and an oxygen-containing compound.

* * * * *